US009398332B2

(12) United States Patent
Dhanabalan et al.

(10) Patent No.: US 9,398,332 B2
(45) Date of Patent: Jul. 19, 2016

(54) CHECKING IN AND CHECKING OUT CONTENT FROM A MEDIA CLIENT DEVICE

(71) Applicant: Verizon Patent and Licensing Inc., Arlington, VA (US)

(72) Inventors: Sankar Ram Dhanabalan, Irving, TX (US); Sameer Gavade, Irving, TX (US); Sanjay Ahuja, Irving, TX (US); Senthil K. Raghavan, Lewisville, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 53 days.

(21) Appl. No.: 14/459,692

(22) Filed: Aug. 14, 2014

(65) Prior Publication Data
US 2016/0050455 A1 Feb. 18, 2016

(51) Int. Cl.
*H04N 21/442* (2011.01)
*H04L 29/08* (2006.01)
*H04L 29/06* (2006.01)
*H04N 21/41* (2011.01)
*H04N 21/4627* (2011.01)
*H04N 21/8355* (2011.01)

(52) U.S. Cl.
CPC .......... *H04N 21/44204* (2013.01); *H04L 63/10* (2013.01); *H04L 63/20* (2013.01); *H04L 67/06* (2013.01); *H04N 21/4126* (2013.01); *H04N 21/4627* (2013.01); *H04N 21/8355* (2013.01)

(58) Field of Classification Search
CPC .................... H04N 21/44204; H04N 21/8355; H04N 63/10; H04N 67/06; H04N 63/20; H04N 21/4126; H04N 21/4627
See application file for complete search history.

(56) References Cited

U.S. PATENT DOCUMENTS

| 2002/0002541 | A1* | 1/2002 | Williams | G06F 21/10 705/51 |
| 2004/0236697 | A1* | 11/2004 | Nagao | G06F 21/10 705/59 |
| 2005/0149340 | A1* | 7/2005 | Murakami | G06F 21/105 705/52 |
| 2005/0154908 | A1* | 7/2005 | Okamoto | G06F 21/10 713/193 |
| 2006/0107330 | A1* | 5/2006 | Ben-Yaacov | G06F 21/10 726/26 |
| 2006/0167956 | A1* | 7/2006 | Chasen | G06F 17/30902 |
| 2006/0242069 | A1* | 10/2006 | Peterka | G06F 21/10 705/50 |
| 2007/0100701 | A1* | 5/2007 | Boccon-Gibod | G06F 21/10 705/21 |
| 2007/0198419 | A1* | 8/2007 | Park | H04L 63/0428 705/52 |

(Continued)

OTHER PUBLICATIONS

Wikipedia, "Set-top box", http://en.wikipedia.org/wiki/Set-top_box, Jul. 18, 2014, 7 pages.

(Continued)

*Primary Examiner* — Joseph P Hirl
*Assistant Examiner* — J. Brant Murphy

(57) ABSTRACT

A device may be configured to store content. The device may store a copy count that indicates a quantity of copies of the content that are checked out from the device. The device may receive a request to provide a first copy of the content to a requesting device. The device may select a client device to which to send a check-in message based on the copy count failing to satisfy a threshold count. The client device may store a second copy of the content that is checked out from the device. The device may send the check-in message to the client device. The device may receive a check-in response from the client device that checks in the second copy of the content. The device may provide the first copy of the content to the requesting device based on an updated copy count satisfying the threshold count.

20 Claims, 12 Drawing Sheets

(56) References Cited

U.S. PATENT DOCUMENTS

| | | | |
|---|---|---|---|
| 2008/0065552 A1* | 3/2008 | Elazar | G06F 21/10 705/59 |
| 2008/0065911 A1* | 3/2008 | Elazar | G06F 21/10 713/194 |
| 2008/0103977 A1* | 5/2008 | Khosravy | G06F 21/10 705/59 |
| 2008/0148363 A1* | 6/2008 | Gilder | G06F 21/10 726/4 |
| 2009/0064347 A1* | 3/2009 | Bang | G06F 21/10 726/29 |
| 2009/0296940 A1* | 12/2009 | Moroney | G06F 21/10 380/278 |
| 2010/0095383 A1* | 4/2010 | Elazar | G06F 21/10 726/26 |
| 2010/0185655 A1* | 7/2010 | Mirrashidi | G06F 21/10 707/769 |
| 2011/0296405 A1* | 12/2011 | Ogura | G06F 21/105 717/178 |
| 2012/0089699 A1* | 4/2012 | Cholas | H04L 12/2812 709/217 |
| 2013/0031170 A1* | 1/2013 | Pacella | H04L 67/10 709/204 |
| 2013/0031643 A1* | 1/2013 | Rogel | G06F 21/10 726/29 |
| 2013/0041932 A1* | 2/2013 | Moore | H04L 63/1425 709/203 |
| 2013/0144979 A1* | 6/2013 | Kansal | H04N 21/23106 709/219 |
| 2014/0075583 A1* | 3/2014 | Martin | G06F 21/10 726/31 |
| 2015/0244973 A1* | 8/2015 | Mullen | H04N 5/913 386/252 |

OTHER PUBLICATIONS

Wikipedia, "Digital video recorder", http://en.wikipedia.org/wiki/Digital_video_recorder#integrated_TV-set_digital_video_recorders, Aug. 1, 2014, 16 pages.

* cited by examiner

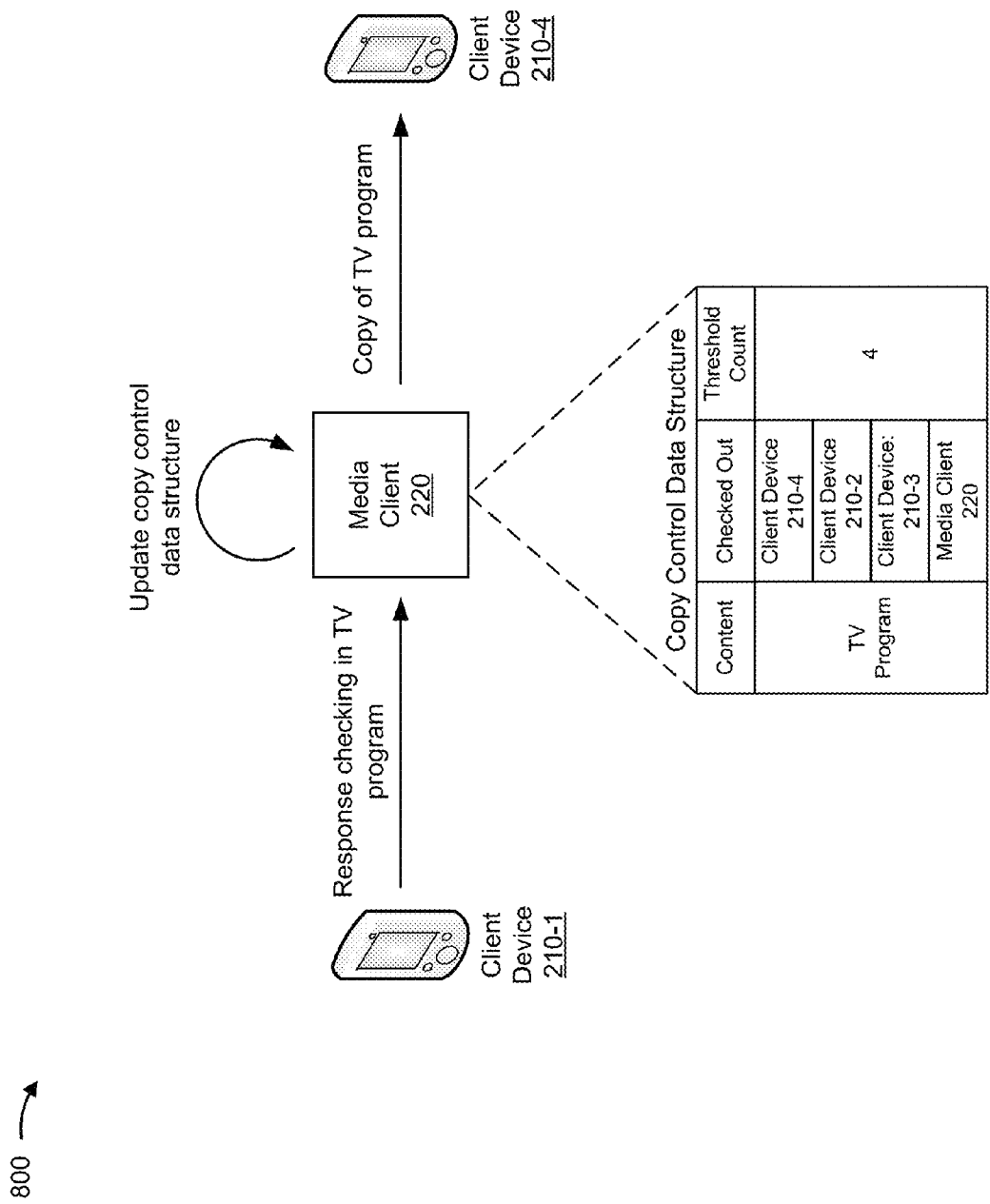

CHECKING IN AND CHECKING OUT CONTENT FROM A MEDIA CLIENT DEVICE

BACKGROUND

A user may use a mobile device (e.g., a smart phone, a tablet computer, etc.) to download content stored by a set-top box. For example, the set-top box may record a TV program, and the user may download the TV program onto the mobile device to watch at a later time. The content may be associated with a restriction that limits the number of copies of the content that may be made and distributed to mobile devices by the set-top box.

BRIEF DESCRIPTION OF THE DRAWINGS

FIGS. 8A-8C are diagrams of an example implementation relating to the example processes shown in FIGS. 4 and 6.

DETAILED DESCRIPTION OF PREFERRED EMBODIMENTS

The following detailed description of example implementations refers to the accompanying drawings. The same reference numbers in different drawings may identify the same or similar elements.

A media client (e.g., a set-top box) may be limited as to how many copies of a content may be distributed to mobile devices at any given time. Accordingly, a situation may arise where a client device (e.g., a smart phone, a tablet computer, etc.) requests to download a copy of the content from the media client, but the media client cannot provide a copy of the content to the mobile device because a maximum number of copies of the content have already been distributed to other client devices. Accordingly, a user of the client device may be denied access to the content even if users of the other client devices do not plan to play back the content or have already played back the content.

Implementations described herein may allow a media client to provide a copy of content to a client device even though a maximum number of copies of the content are checked out by causing another client device to check in a copy of the content first. For example, the media client may request that another client device check in the content and/or force the other client device to check in a copy of the content so that a copy of the content may be provided to a client device requesting a copy of the content.

Figure 1:
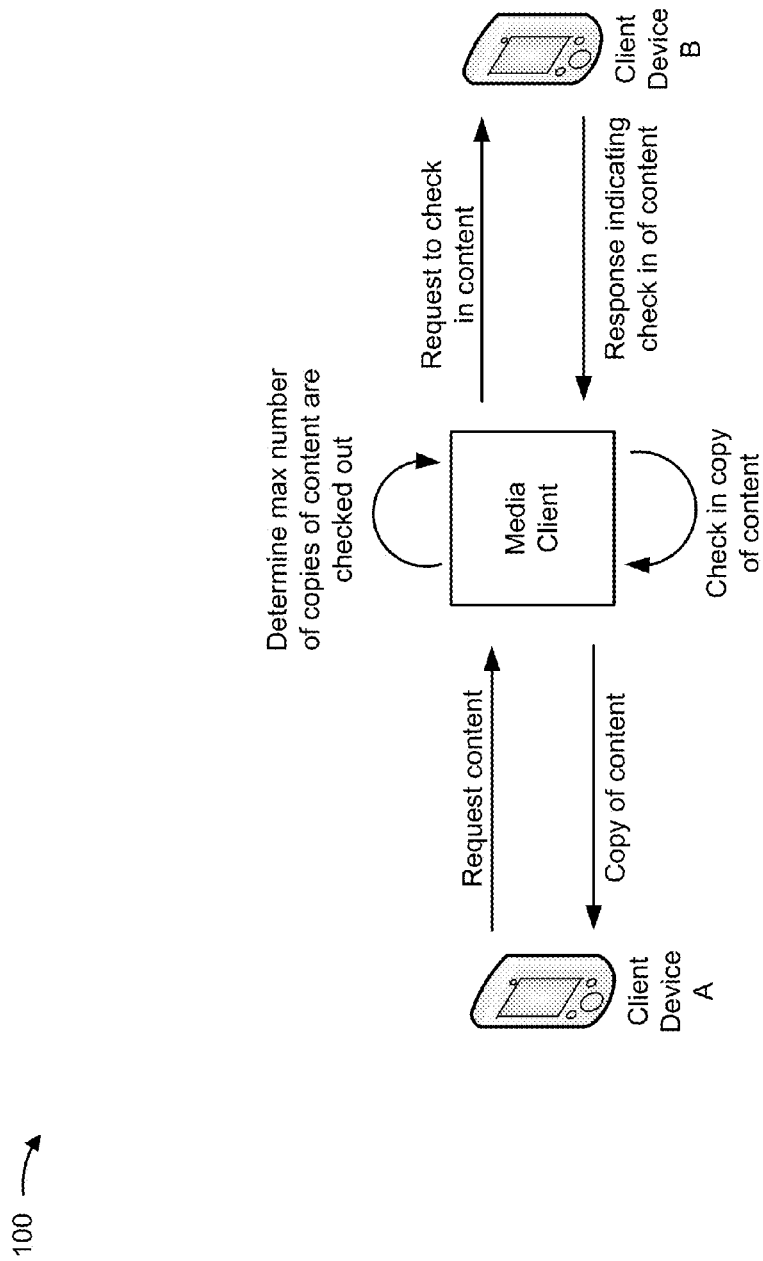
FIG. 1 is a diagram of an overview of an example implementation described herein.

FIG. 1 is a diagram of an overview of an example implementation 100 described herein. In FIG. 1, assume a client device A and a client device B may check out content (e.g., a TV program, a movie, etc.) from a media client. Also, assume the media client recorded the content and stores the content in a memory included in or accessible by the media client. Further, assume the media client has already checked out and sent a maximum permitted number of copies of the content to client devices, including client device B. In other words, assume client device B stores a copy of the content.

As shown in FIG. 1, client device A may send a request for a copy of content to the media client. The media client may receive the request and determine that a maximum number of copies of the content are already checked out to other client devices, including client device B. The media client may store copy control information that indicates which client devices have checked out a copy of the content and send a check-in request to those client devices, including client device B. The check-in request may request that the client device (e.g., client device B) check in a copy of the content so that a copy of the content may be sent to client device A.

Client device B may receive the check-in request and determine to check in the content based on user input and/or automatically determine to check in the content if the content has already been played back on client device B. In some implementations, client device B may be forced by the media client to check in a copy of the content. Client device B may send a response to media client indicating client device B is checking in the content. For example, the response may include the copy of the content stored by client device B and/or indicate that client device B has deleted the copy of the content stored by client device B.

The media client may receive the response and update the copy control information to indicate that client device B checked in a copy of the content and that a copy of the content is available to send to client device A. The media client may then send a copy of the content to client device A and update the copy control data structure to indicate a copy of the content is checked out to client device A.

In this way, a copy of the content may be provided to client device A even if a maximum number of copies has already been checked out at the time client device A requests the copy of the content from the media client.

Figure 2:
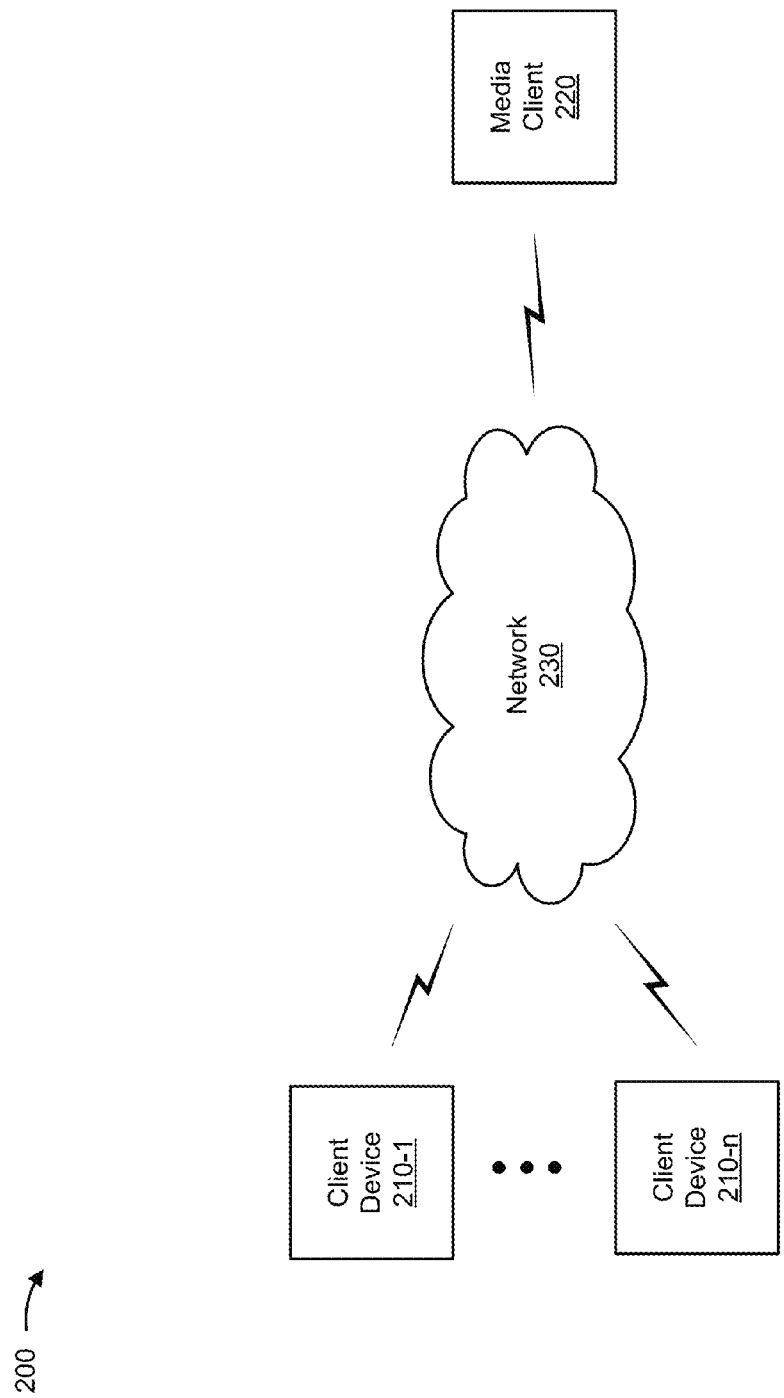
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-n (n≥1) (hereinafter referred to collectively as "client devices 210," and individually as "client device 210"), a media client 220, and/or a network 230. Devices of environment 200 may interconnect via wired connections, wireless connections, or a combination of wired and wireless connections.

Client device 210 may include a device capable of receiving, generating, storing, processing, and/or providing information. For example, client device 210 may include a communications and/or computing device, such as a mobile phone (e.g., a smart phone, a radiotelephone, etc.), a desktop computer, a laptop computer, a tablet computer, a handheld computer, a gaming device, or a similar device. In some implementations, client device 210 may receive information from and/or transmit information to another device in environment 200. In some implementations, client device 210 may check out and/or check in a copy of content from media client 220.

Media client 220 may include a device capable of receiving, transmitting, and/or processing multimedia content and providing the multimedia content to a user (e.g., via a display device) or a client device 210. Examples of media client 220 may include a set-top box, a casting stick (e.g., a high-definition media interface (HDMI) dongle), a computer, a cable card, a gaming device, a portable electronic device, and/or another type of device capable of receiving, transmitting, and/or processing multimedia content and providing the multimedia content to a user.

Network 230 may include one or more wired and/or wireless networks. For example, network 230 may include a cellular network (e.g., an Long Term Evolution (LTE) network, a third generation (3G) network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
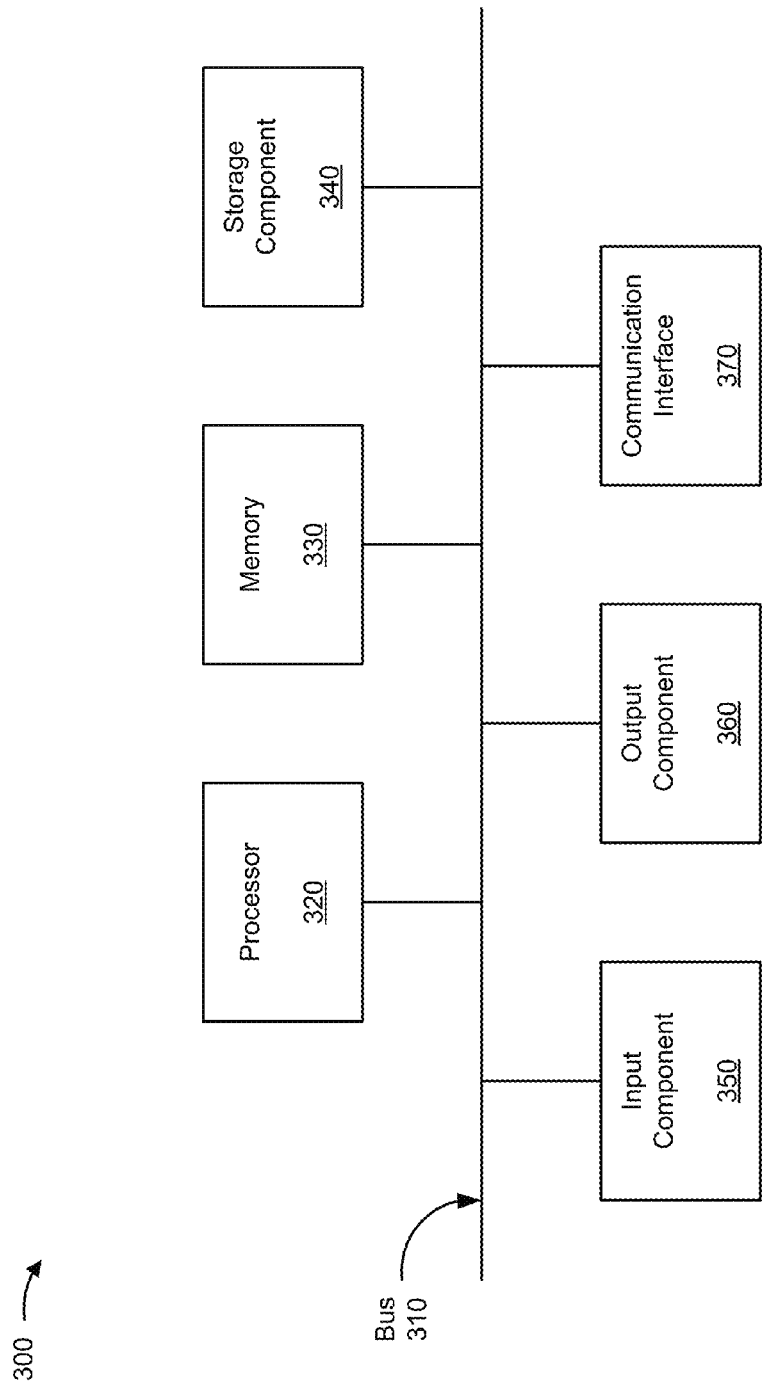
FIG. 3 is a diagram of example components of one or more devices of FIG. 2.

FIG. 3 is a diagram of example components of a device 300. Device 300 may correspond to client device 210 and/or media client 220. In some implementations, client device 210 and/or media client 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
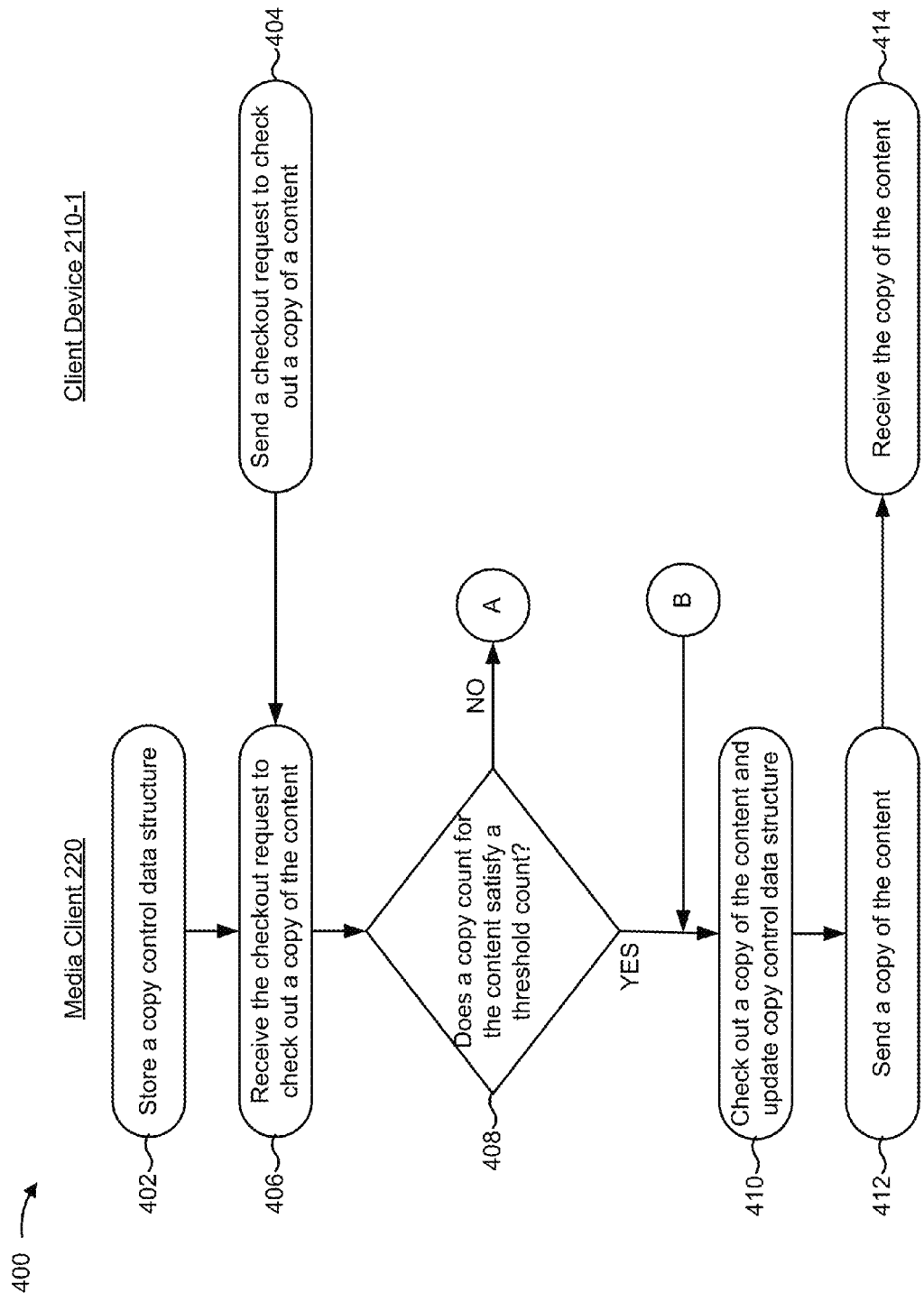
FIG. 4 is a flow chart of an example process for checking out a copy of a content.

FIG. 4 is a flow chart of an example process 400 for checking out a copy of a content. In some implementations, one or more process blocks of FIG. 4 may be performed by media client 220 and/or client device 210 (e.g., client device 210-1). Additionally, or alternatively, one or more process blocks of FIG. 4 may be performed by another device or a group of devices separate from or including media client 220 and/or client device 210-1, such as another client device 210 (e.g., client device 210-2).

As shown in FIG. 4, process 400 may include storing a copy control data structure (block 402). For example, media client 220 may store the copy control data structure in a memory included in or accessible by media client 220.

The copy control data structure may indicate a threshold count for content. The threshold count may indicate a maximum number of copies of the content that are permitted to be checked out at any given time. The threshold count may be set by an owner or provider of the content. In some implementations, the content may include multimedia content stored in a memory included in or accessible by media client 220. For example, the content may include a TV program, a movie, a song, and/or another audio and/or video recording.

Additionally, or alternatively, the copy control data structure may identify a copy count that indicates a quantity of copies of the content that are currently checked out to client devices 210 and/or media client 220.

For example, media client 220 may check out a copy of the content to a client device 210 based on media client 220 sending a copy of the content to a client device 210. Additionally, or alternatively, media client 220 may check out a copy of the content based on media client 220 storing a copy of the content. Accordingly, media client 220 may increment the copy count each time a copy of the content is checked out.

On the other hand, media client 220 may check in a copy of the content based on a client device 210 returning the copy of the content to media client 220, and/or based on client device 210 deleting the copy of the content from a memory included in or accessible by client device 210 and informing media client 220 of the deletion. Additionally, or alternatively, media client 220 may check in a copy of the content by prohibiting the copy of the content stored by media client 220 from being presented by media client 220 via a connected display device. Accordingly, media client 220 may decrement the copy count each time a copy of the content is checked in.

Additionally, or alternatively, the copy control data structure may include client device information. The client device information may identify which client devices 210 have a copy of the content checked out and when a copy of the content was checked out to respective client devices 210 (e.g., a date and/or a time a copy of the content was checked out). The client device information may include contact information for the client devices 210 (e.g., a phone number, an Internet Protocol (IP) address, an email address, etc.). In some implementations, the client device information may indicate an order of priority of client devices 210. For example, the order of priority may indicate an order that client devices 210 are entitled to a copy of the content. In some implementations, the order of priority may be user customizable. Additionally, or alternatively, the client device information may indicate an amount of content checked out to respective client devices 210. For example, the client device information may indicate a number of copies of content checked out to a client device 210 (e.g., a number of TV programs, movies, etc. checked out to client device 210) and/or a size of the content checked out to client device 210 (e.g., a number of megabytes, gigabytes, etc.).

As further shown in FIG. 4, process 400 may include sending a checkout request to check out a copy of a content (block 404). For example, client device 210-1 may send the checkout request to check out a copy of the content to media client 220 via network 230. The checkout request may request that media client 220 send the content (e.g., a copy of the content) to client device 210-1. In some implementations, the request may be to stream a copy of the content and/or download a copy of the content.

In some implementations, media client 220 may provide client device 210-1 with a list of content that may be checked out by client device 210-1. Client device 210-1 may present the list of content to a user of client device 210-1 via a user interface. The user interface may include an icon associated with content that has a maximum number of permitted copies already checked out to other client devices 210. Accordingly, the user may be informed whether a request for content may cause another client device 210 to check-in a copy of the content. A user of client device 210-1 may select the content to request from the list of content.

As further shown in FIG. 4, process 400 may include receiving the checkout request to check out a copy of the content (block 406). For example, media client 220 may receive the checkout request to check out a copy of the content from client device 210-1.

As further shown in FIG. 4, process 400 may include determining whether a copy count for the content satisfies a threshold count (block 408). For example, media client 220 may determine whether the copy count satisfies the threshold count.

Media client 220 may compare the copy count for the content to the threshold count for the content to determine if the copy count satisfies the threshold count. In some implementations, if the copy count is less than the threshold count, then the copy count may satisfy the threshold count. In other words, if fewer copies of the content than a maximum number of copies of the content that are permitted to be checked out at any given time are checked out at the time the checkout request is received, then media client 220 may determine that the copy count satisfies the threshold count.

On the other hand, if the copy count is greater than or equal to the threshold count, then the copy count may not satisfy the threshold count. In other words, if more copies of the content or a same number of copies of the content than the maximum number of copies of the content that are permitted to be checked out at any given time are checkout out at the time the checkout request is received, then media client 220 may determine that the copy count does not satisfy the threshold count.

As further shown in FIG. 4, if the copy count is determined to satisfy the threshold count (block 408—yes), process 400 may include checking out a copy of the content and updating the copy control data structure (block 410). For example, media client 220 may check out the copy of the content and update the copy control data structure.

Media client 220 may check out a copy of the content by incrementing the copy count. Additionally, or alternatively, media client 220 may update the copy control data structure to reflect the updated copy count.

In some implementations, media client 220 may update the client device information, included in the copy control data structure, to indicate a copy of the content is checked out to client device 210-1 and to indicate when the copy of the content was checked out to client device 210-1. Additionally, or alternatively, media client 220 may update the client device information to increment a number of copies of content checked out to client device 210-1 based on checking out the copy of the content to client device 210-1. Additionally, or alternatively, media client 220 may update a size of the content checked out to client device 210-1 based on the size of the copy of the content being checked out to client device 210-1.

As further shown in FIG. 4, process 400 may include sending a copy of the content (block 412). For example, media client 220 may send a copy of the content to client device 210-1 based on the checkout request.

In some implementations, media client 220 may generate a copy of the content and send the copy of the content to client device 210-1 via network 230. Additionally, or alternatively, media client 220 may store multiple copies of the content, and send one of the copies of the content to client device 210-1 via network 230.

In some implementations, media client 220 may send copy restriction information to client device 210-1 with the copy of the content. The copy restriction information may prevent client device 210-1 from making other copies of the content and/or from transferring the copy of the content to another device other than media client 220.

In some implementations, there may be a time delay between client device 210-1 sending the checkout request at block 404 and media client 220 being ready to send a copy of the content at block 412. For example, as will be discussed later with respect to FIGS. 5A-6, another client device 210 may have to check-in a copy of the content before a copy of the content may be sent to client device 210-1. During this time delay, circumstances for client device 210-1 may change and client device 210-1 may no longer be in a position to receive the copy of the content. For example, client device 210-1 may move into a location with a poor network connection or where a transfer of data becomes expensive (e.g., moving from a Wi-Fi connection to a LTE connection). Accordingly, media client 220 may send client device 210-1 an availability notification to client device 210-1 before sending a copy of the content to client device 210-1. The availability notification may indicate that a copy of the content is available to send to client device 210-1. Media client 220 may wait for client device 210-1 to respond to the availability message before sending the copy of the content to client device 210-1 to ensure client device 210-1 is ready to receive the copy of the content.

As further shown in FIG. 4, process 400 may include receiving the copy of the content (block 414). For example, client device 210-1 may receive a copy of the content and/or the copy restriction information from media client 220.

Client device 210-1 may store the copy of the content in a memory included in or accessible by client device 210-1. Client device 210-1 may access the copy of the content and present the content to a user of client device 210-1 (e.g., via a display device).

As further shown in FIG. 4, if the copy count is determined not to satisfy the threshold count (block 408—no), process 400 may advance to a check-in process for checking in a copy of the content from another client device 210 (e.g., client device 210-2) so that the threshold count will be satisfied, media client 220 may check out a copy of the content to client device 210-1, and media client 220 may send a copy of the content to client device 210-1. For example, if the copy count is determined not to satisfy the threshold count (block 408—no), process 400 may advance to first example process 500 for checking in a copy of the content (as will be discussed in more detail with respect to FIGS. 5A and 5B) and/or advance to second example process 600 for checking in a copy of the content (as will be discussed in more detail with respect to FIG. 6).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
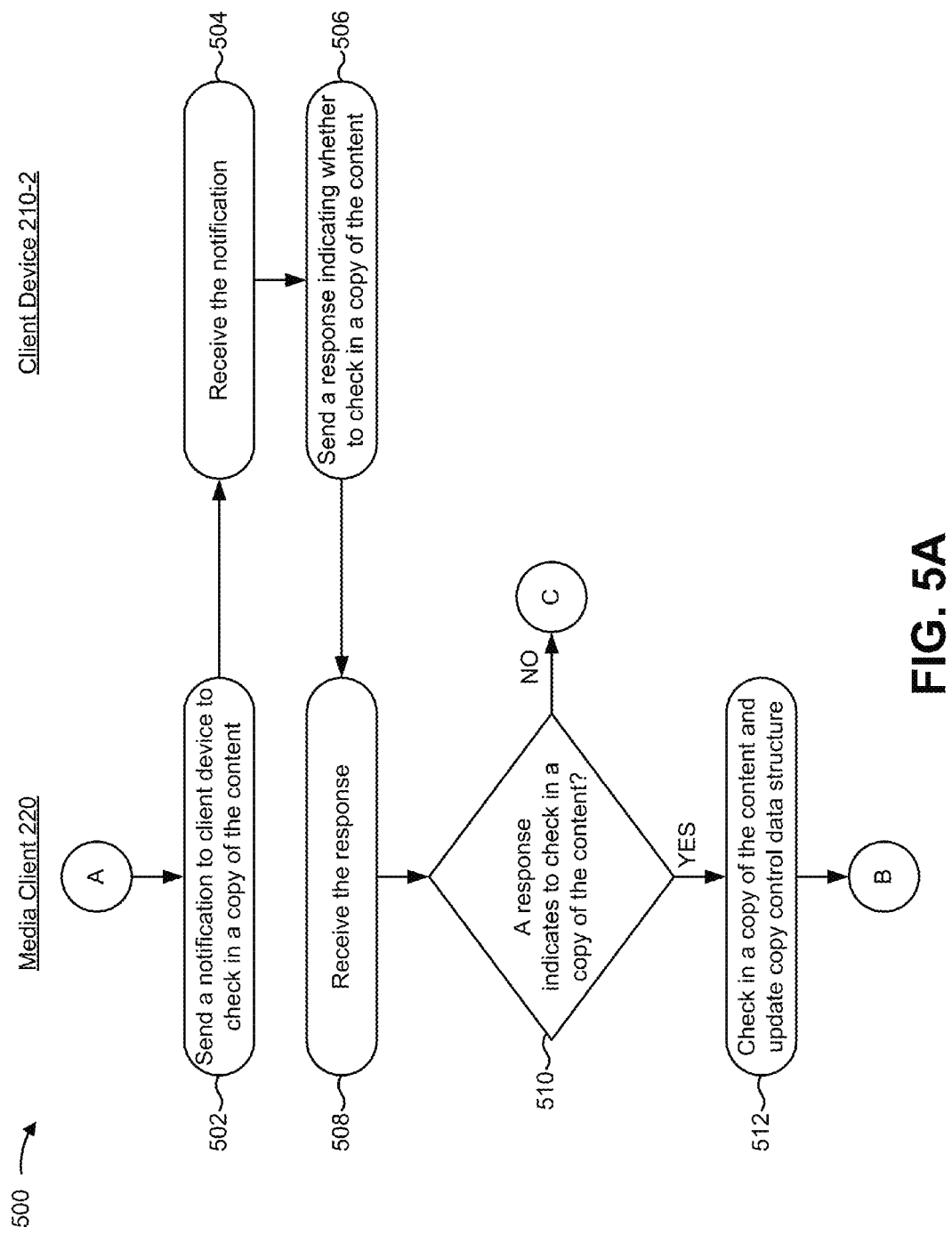
FIGS. 5A and 5B are a flow chart of a first example process for checking in a copy of the content.
Figure 5B:
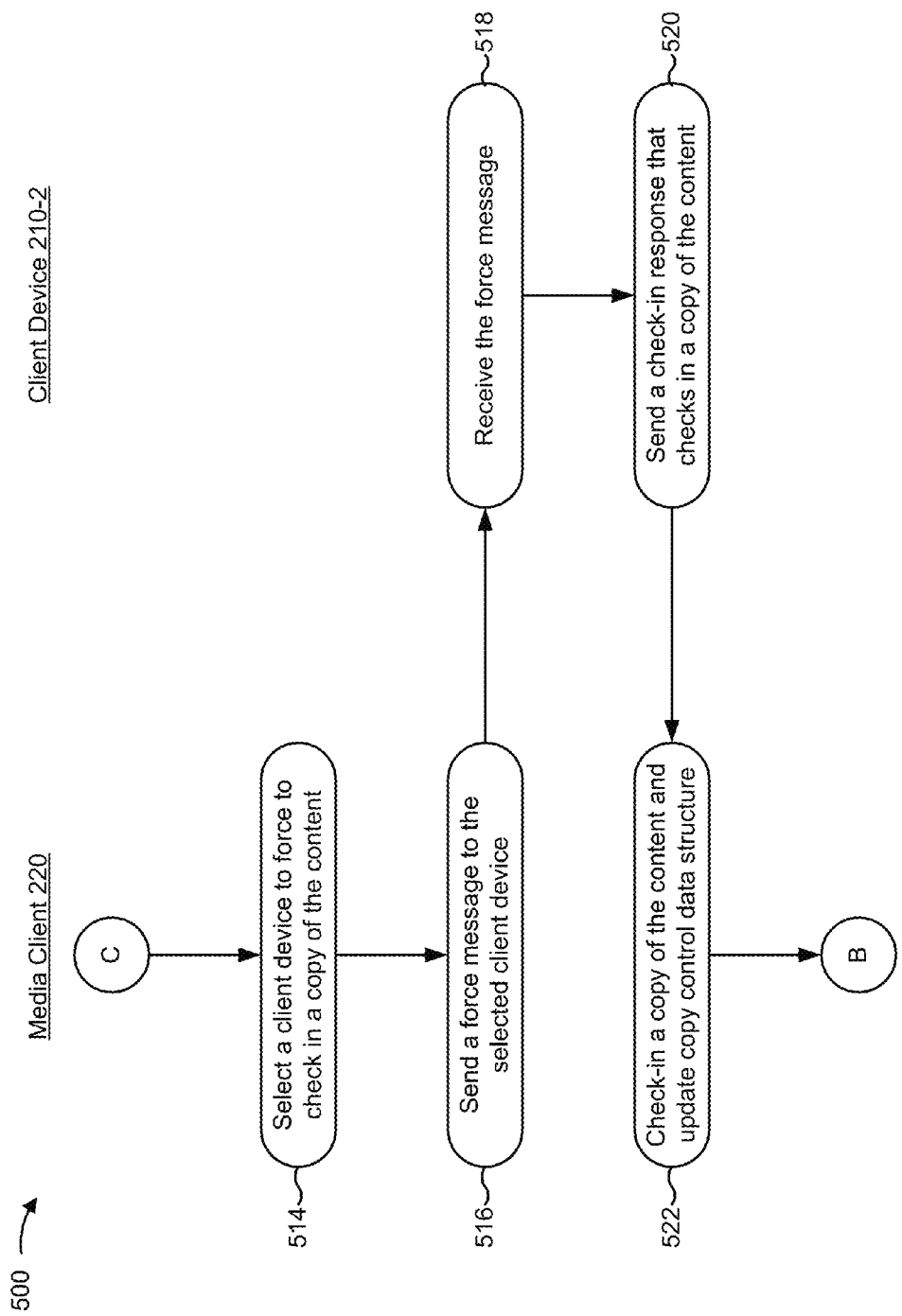

FIGS. 5A and 5B are a flow chart of a first example process 500 for checking in a copy of the content. In some implementations, one or more process blocks of FIGS. 5A and 5B may be performed by media client 220 and/or client device 210 (e.g., client device 210-2). Additionally, or alternatively, one or more process blocks of FIGS. 5A and 5B may be performed by another device or a group of devices separate from or including media client 220 and/or client device 210-2, such as another client device 210 (e.g., client device 210-1).

As shown in FIG. 5A, if the copy count is determined not to satisfy the threshold count (block 408 of FIG. 4—no), process 500 may include sending a notification to client device 210-2 to check in a copy of the content (block 502). For example, media client 220 may send the notification to client device 210-2.

In some implementations, media client 220 may send the notification to each client device 210 that has a copy of the content checked out. For example, media client 220 may determine which client devices 210 have a copy of the content checked out based on the client device information included in the copy control data structure.

In some implementations, media client 220 may select a client device 210 to which to send the notification based on when the copies of the content were checked out to the respective client devices 210. For example, media client 220 1 may select the earliest client device 210 that checked out the content as the client device 210 to which to send the notification. In this way, client devices 210 may be prevented from keeping a copy of the content checked out for extended periods of time.

In some implementations, media client 220 may select a client device 210 to which to send the notification based on the order of priority indicated by the client device information. For example, media client 220 may select a client device 210 with a lowest priority to send the notification. In this way, higher priority client devices 210 may be able to keep copies of the content while lower priority client devices 210 may have to give up copies of the content.

In some implementations, media client 220 may select a client device 210 to send the notification based on an amount of content (e.g., a number of copies of content and/or a size of the copies of content) checked out to each client device 210. For example, media client 220 may select a client device 210 with the largest amount of content checked out to send the notification. In this way, client devices 210 may be ensured to receive at least some content and not have all the content checked out by particular client devices 210.

Various factors have been discussed that may be the basis for determining which client devices(s) 210 to which to send the notification. Media client 220 may determine which client device(s) 210 to which to send the notification based on these factors individually or a combination of these factors. In some implementations, a score may be generated for each factor. The scores for each factor may be weighted and combined to determine a total score for each client device 210. Media client 220 may determine which client device(s) 210 to which to send the notification based on the total score for each frequency.

Assume that the client device information indicates that client device 210-2 has a copy of the content checked out. Accordingly, media client 220 may send the notification to client device 210-2.

The notification may include a request for client device 210 (e.g., client device 210-2) to check in a copy of the content. In some implementations, the notification may include an email, a push notification, a text message, an alert, and/or another type of notification.

As further shown in FIG. 5A, process 500 may include receiving the notification (block 504). For example, client device 210-2 may receive the notification from media client 220.

In some implementations, client device 210-2 may present the notification to a user of client device 210-2. The user may select whether to check in the content via user input.

In some implementations, client device 210-2 may automatically determine whether to check in the content. For example, client device 210-2 may automatically determine to check in the content if the content has already been played back on client device 210-2. On the other hand, client device 210-2 may automatically determine not to check in the content if the content has not been played back on client device 210-2.

If client device 210-2 determines to check in the content (e.g., automatically or via user input), client device 210-2 may generate a response indicating to check in a copy of the content. In some implementations, the response may include all or part of the copy of the content itself. Accordingly, when the response is sent to media client 220, the copy of the content will be removed from client device 210-2. In some implementations, client device 210-2 may delete the copy of the content from the memory storing the copy of the content, and the response may include a confirmation that the copy of the content has been deleted by client device 210-2.

If client device 210-2 determines not to check in the content (e.g., automatically or via user input), client device 210-2 may generate a response indicating that the copy of the content will not be checked in. In some implementations, the response may also indicate whether the content has been played back on client device 210-2.

As further shown in FIG. 5A, process 500 may include sending the response indicating whether to check in a copy of the content (block 506). For example, client device 210-2 may send the response to media client 220 based on the notification.

As further shown in FIG. 5A, process 500 may include receiving the response (block 508). For example, media client 220 may receive the response indicating whether to check in a copy of the content from client device 210-2 and/or another client device 210 to which the notification was sent.

In some implementations, media client 220 may send notifications to client devices 210 until a response indicates to check in a copy of the content or all client devices 210 that have a checked out copy of the content agree not to check in a copy of the content.

As further shown in FIG. 5A, process 500 may include determining whether any response indicates to check in a copy of the content (block 510). For example, media client 220 may determine whether any of the responses received from client devices 210 (e.g., client device 210-2) indicate that a copy of the content is to be checked in.

Media client 220 may determine that a response indicates to check in a copy of the content if the response includes all or part of a copy of the content and/or a confirmation that a copy of the content has been deleted by a client device 210 (e.g., client device 210-2).

On the other hand, media client 220 may determine that no response indicates to check in a copy of the content if all of the responses indicate that a copy of the content will not be checked in. Additionally, or alternatively, if a response is not received from a client device 210 within a particular amount of time, media client 220 may determine that the client device 210 will not check in a copy of the content.

As further shown in FIG. 5A, if any response indicates to check in a copy of the content (block 510—yes), process 500 may include checking in a copy of the content and updating the copy control data structure (block 512). For example, media client 220 may check in the copy of the content and update the copy control data structure based on checking in the copy of the content.

In some implementations, media client 220 may decrement the copy count based on the copy of the content being check in. Additionally, or alternatively, media client 220 may update the client device information, included in the copy control data structure, to reflect that a copy of the content is no longer checked out to client device 210 that checked in the copy of the content.

Once the copy of the content has been checked in, media client 220 may advance to block 410 of FIG. 4 to check out and send a copy of the content to client device 210-1 that requested the copy of the content.

As shown in FIG. 5B, if the response indicates that a copy of the content will not be checked in (block 510—no), process 500 may include selecting a client device 210 to force to check in a copy of the content (block 514). For example, media client 220 may select a client device 210 to force to check in a copy of the content when none of client devices 210 will check in a copy of the content.

In some implementations, media client 220 may identify which client devices 210 have a copy of the content checked out from the copy control data structure. Media client 220 may select one or more client devices 210 from among these client devices 210 to force to check in a copy of the content.

In some implementations, media client 220 may select a client device 210 to force to check in a copy of the content based on when the copies of the content were checked out to the respective client devices 210. For example, media client 220 may select the earliest client device 210 that checked out the content as the client device 210 to force to check in the content. In this way, client devices 210 may be prevented from keeping a copy of the content checked out for extended periods of time.

In some implementations, media client 220 may select a client device 210 to force to check in a copy of the content based on the order of priority indicated by the client device information. For example, media client 220 may select a client device 210 with a lowest priority to force to check in a copy of the content. In some implementations, media client 220 may only force a client device 210 to check in a copy of the content if the client device 210 requesting the copy of the content (e.g., client device 210-1) has a higher priority than a client device 210 that currently has a copy of the content checked out (e.g., client device 210-2). In this way, higher priority client devices 210 may be able to keep copies of the content while lower priority client devices 210 may have to give up copies of the content.

In some implementations, media client 220 may select a client device 210 to force to check in a copy of the content based on an amount of content (e.g., a number of copies of content and/or a size of the copies of content) checked out to each client device 210. For example, media client 220 may select a client device 210 with the largest amount of content checked out to force to check in a copy of the content. In this way, client devices 210 may be ensured to receive at least some content and not have all the content checked out by particular client devices 210.

In some implementation, media client 220 may select a client device 210 to force to check in a copy of the content based on whether the client device 210 has presented or played back the copy of the content. For example, media client 220 may select a client device 210 that sent a response to the notification that indicates the copy of the content has already been presented or played back by the client device 210. In this way, client devices 210 are prevented from storing a copy of the content that may not be played back again and/or ensure that client devices 210 play back the copy of the content before being forced to check in the copy of the content.

In some implementations, media client 220 may randomly select a client device 210 to force to check in a copy of the content.

In some implementations, media client 220 may select a client device to force to check in a copy of the content based on user input. For example, media client 220 may send, to client device 210-1, a list of client devices 210 that have a copy of the content checked out. Client device 210-1 may receive the list and display the list to a user of client device 210-1. The user may select a client device 210 to force to check in a copy of the content via user input. Client device 210-1 may send information indicating the selected client device 210 to media client 220, and media client 220 may select that client device 210 to force to check in a copy of the content.

Various factors have been discussed that may be the basis for determining which client devices(s) 210 to force to check in a copy of the content. Media client 220 may determine which client device(s) 210 to force to check in a copy of the content based on these factors individually or a combination of these factors. In some implementations, a score may be generated for each factor. The scores for each factor may be weighted and combined to determine a total score for each client device 210. Media client 220 may determine which client device(s) 210 to force to check in a copy of the content based on the total score for each frequency.

If media client 220 attempts to force a client device 210 to check in a copy of the content and fails to force the client device 210 to check in the content (e.g., client device 210 is not connected to network 230, client device 210 is not powered on, client device 210 fails to respond to being forced to check in a copy of the content, etc.), media client 220 may select another client device 210 to force to check in a copy of the content until a copy of the content is checked in.

In FIG. 5B, assume media client 220 selects client device 210-2 to force to check in a copy of the content.

As further shown in FIG. 5B, process 500 may include sending a force message to the selected client device 210 (block 516). For example, media client 220 may send the force message to client device 210-2. The force message may include a command instructing client device 210-2 to automatically check in a copy of the content.

As further shown in FIG. 5B, process 500 may include receiving the force message (block 518). For example, client device 210-2 may receive the force message from media client 220.

Client device 210-2 may generate a check-in response based on the force message. The check-in response may include all or part of the copy of the content itself. Accordingly, when the response is sent to media client 220, the copy of the content will be removed from client device 210-2. In some implementations, client device 210-2 may delete the copy of the content from the memory storing the copy of the content based on the force message, and the check-in response may include a confirmation that the copy of the content has been deleted by client device 210-2.

As further shown in FIG. 5B, process 500 may include sending the check-in response that checks in a copy of the content (block 520). For example, client device 210-2 may send the check-in response to media client 220.

As further shown in FIG. 5B, process 500 may include checking in a copy of the content and updating the copy control data structure (block 522). For example, media client 220 may check in a copy of the content and update the copy control data structure based on the check-in response.

Media client 220 may receive the check-in response sent by client device 210-2 and check in a copy of the content based on the check-in response. In some implementations, media client 220 may decrement the copy count based on the copy of the content being check in. Additionally, or alternatively, media client 220 may update the client device information, included in the copy control data structure, to reflect that a copy of the content is no longer checked out to client device 210-2.

Once the copy of the content has been checked in, media client 220 may advance to block 410 of FIG. 4 to check out and send a copy of the content to client device 210-1 that requested the copy of the content.

Although FIGS. 5A and 5B show example blocks of process 500, in some implementations, process 500 may include additional blocks, fewer blocks, different blocks, or differently arranged blocks than those depicted in FIGS. 5A and 5B. Additionally, or alternatively, two or more of the blocks of process 500 may be performed in parallel.

Figure 6:
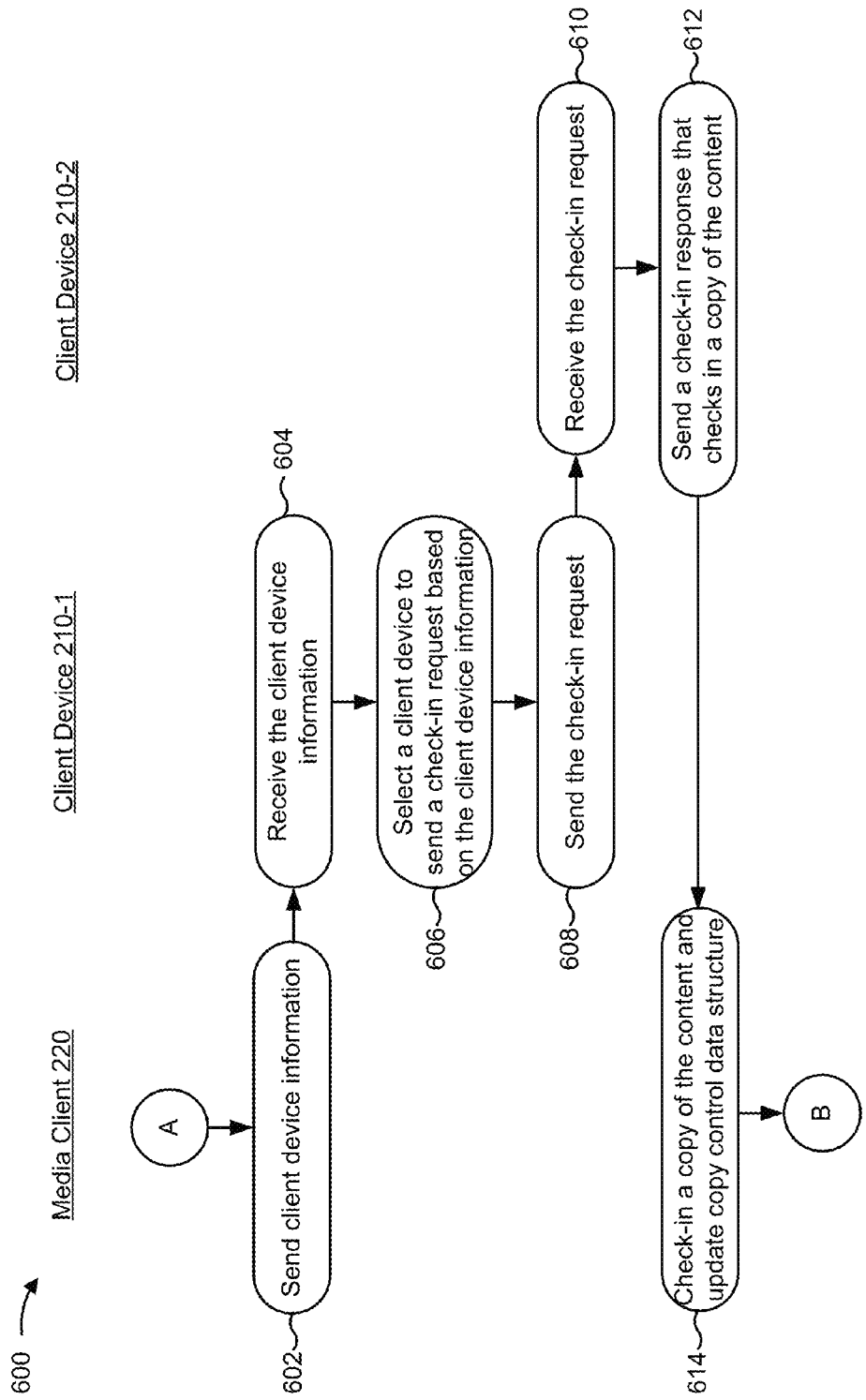
FIG. 6 is a flow chart of a second example process for checking in a copy of the content.

FIG. 6 is a flow chart of a second example process 600 for checking in a copy of a content. In some implementations, one or more process blocks of FIG. 6 may be performed by media client 220 and/or client devices 210 (e.g., client device 210-1 and/or client device 210-2). Additionally, or alternatively, one or more process blocks of FIG. 6 may be performed by another device or a group of devices separate from or including media client 220, client device 210-1, and/or client device 210-2, such as another client device 210 (e.g., client device 210-n).

As shown in FIG. 6, if the copy count is determined not to satisfy the threshold count (block 408 of FIG. 4—no), process 600 may include sending client device information (block 602). For example, media client 220 may send the client device information to client device 210-1.

The client device information may identify which client devices 210 have a copy of the content checked out and when a copy of the content was checked out to respective client devices 210 (e.g., a date and/or a time a copy of the content was checked out). The client device information may include contact information for the client devices 210 (e.g., a phone number, an IP address, an email address, etc.). In some implementations, the client device information may indicate an order of priority of client devices 210. For example, the order of priority may indicate an order that client devices 210 are entitled to a copy of the content. Additionally, or alternatively, the client device information may indicate an amount of content checked out to respective client devices 210. For example, the client device information may indicate a number of copies of content checked out to a client device 210 (e.g., a number of TV programs, movies, etc. checked out to client device 210) or a size of the content checked out to client device 210 (e.g., a number of megabytes, gigabytes, etc.).

Additionally, or alternatively, media client 220 may send a message to client device 210-1 that indicates a maximum number of copies of the content are already checked out and that a copy of the content cannot be sent to client device 210-1 until another copy of the content is checked in by another client device 210.

As further shown in FIG. 6, process 600 may include receiving the client device information (block 604). For example, client device 210-1 may receive the client device information from media client 220.

As further shown in FIG. 6, process 600 may include selecting a client device 210 to which to send a check-in request based on the client device information (block 606). For example, client device 210-1 may select a client device 210 to which to send the check-in request.

In some implementations, client device 210-1 may select a client device 210 to which to send the check-in request based on user input. For example, client device 210-1 may present the client device information to a user of client device 210-1 and allow the user to select a client device 210 to which to send the check-in request.

In some implementations, client device 210-1 may send the check-in request to each of the client devices 210 indicated by the client device information.

In some implementations, client device 210-1 may select a client device 210 to which to send the check-in request based on when the copies of the content were checked out to the respective client devices 210. For example, client device 210-1 may select the earliest client device 210 that checked out the content as the client device 210 to which to send the check-in request. In this way, client devices 210 may be prevented from keeping a copy of the content checked out for extended periods of time.

In some implementations, client device 210-1 may select a client device 210 to which to send the check-in request based on the order of priority indicated by the client device information. For example, client device 210-1 may select a client device 210 with a lowest priority to send the check-in request. In this way, higher priority client devices 210 may be able to keep copies of the content while lower priority client devices 210 may have to give up copies of the content.

In some implementations, client device 210-1 may select a client device 210 to send the check-in request based on an amount of content (e.g., a number of copies of content and/or a size of the copies of content) checked out to each client device 210. For example, client device 210-1 may select a client device 210 with the largest amount of content checked out to send the check-in request. In this way, client devices 210 may be ensured to receive at least some content and not have all the content checked out by particular client devices 210.

In some implementations, client device 210-1 may randomly select a client device 210 to which to send the check-in request.

In FIG. 6, assume client device 210-1 selects client device 210-2 as the client device 210 to which to send the check-in request.

As further shown in FIG. 6, process 600 may include sending the check-in request (block 608). For example, client device 210-1 may send the check-in request to client device 210-2.

The check-in request may include a request for client device 210 (e.g., client device 210-2) to check in a copy of the content with media client 220. In some implementations, the check-in request may include an email, a push notification, a text message, an alert, or another type of notification.

As further shown in FIG. 6, process 600 may include receiving the check-in request (block 610). For example, client device 210-2 may receive the check-in request from client device 210-1.

In some implementations, client device 210-2 may present the check-in request to a user of client device 210-2. The user may select to check in a copy of the content via user input.

In some implementations, client device 210-2 may automatically determine to check in the content. For example, client device 210-2 may automatically determine to check in the content if the content has already been played back on client device 210-2. On the other hand, client device 210-2 may automatically determine not to check in the content if the content has not been played back on client device 210-2.

Client device 210-2 may generate a check-in response based on the check-in request. The check-in response may include all or part of the copy of the content itself. Accordingly, when the response is sent to media client 220, the copy of the content will be removed from client device 210-2. In some implementations, client device 210-2 may delete the copy of the content from the memory storing the copy of the content based on the check-in request, and the check-in response may include a confirmation that the copy of the content has been deleted by client device 210-2.

In some implementations, the check-in response may indicate that a copy of the content should be checked-out to client device 210-1. In other words, the check-in response may instruct media client 220 to reserve a copy of the content for client device 210-1 based on client device 210-2 checking in a copy of the content.

As further shown in FIG. 6, process 600 may include sending a check-in response that checks in a copy of the content (block 612). For example, client device 210-2 may send the check-in response to media client 220.

As further shown in FIG. 6, process 600 may include checking in a copy of the content and updating the copy control data structure (block 614). For example, media client 220 may check in a copy of the content and update the copy control data structure based on the check-in response.

Media client 220 may receive the check-in response sent by client device 210-2 and check in a copy of the content based on the check-in response. In some implementations, media client 220 may decrement the copy count based on the copy of the content being checked in. Additionally, or alternatively, media client 220 may update the client device information, included in the copy control data structure, to reflect that a copy of the content is no longer checked out to client device 210-2.

Once the copy of the content has been checked in, media client 220 may advance to block 410 of FIG. 4 to check out and send a copy of the content to client device 210-1 that requested the copy of the content.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Although first example process 500 of FIGS. 5A and 5B, and second example process 600 of FIG. 6 have been described separately, first example process 500 and second example process 600 may be combined and/or both may be performed by media client 220 and/or client devices 210. For example, if first example process 500 fails to successfully check in a copy of the content, media client 220 and client device 210 may perform second example process 600 to attempt to check in a copy of the content. Similarly, if second example process 600 fails to successfully check in a copy of the content, media client 220 and client device 210 may perform first example process 500 to attempt to check in a copy of the content.

Figure 7A:
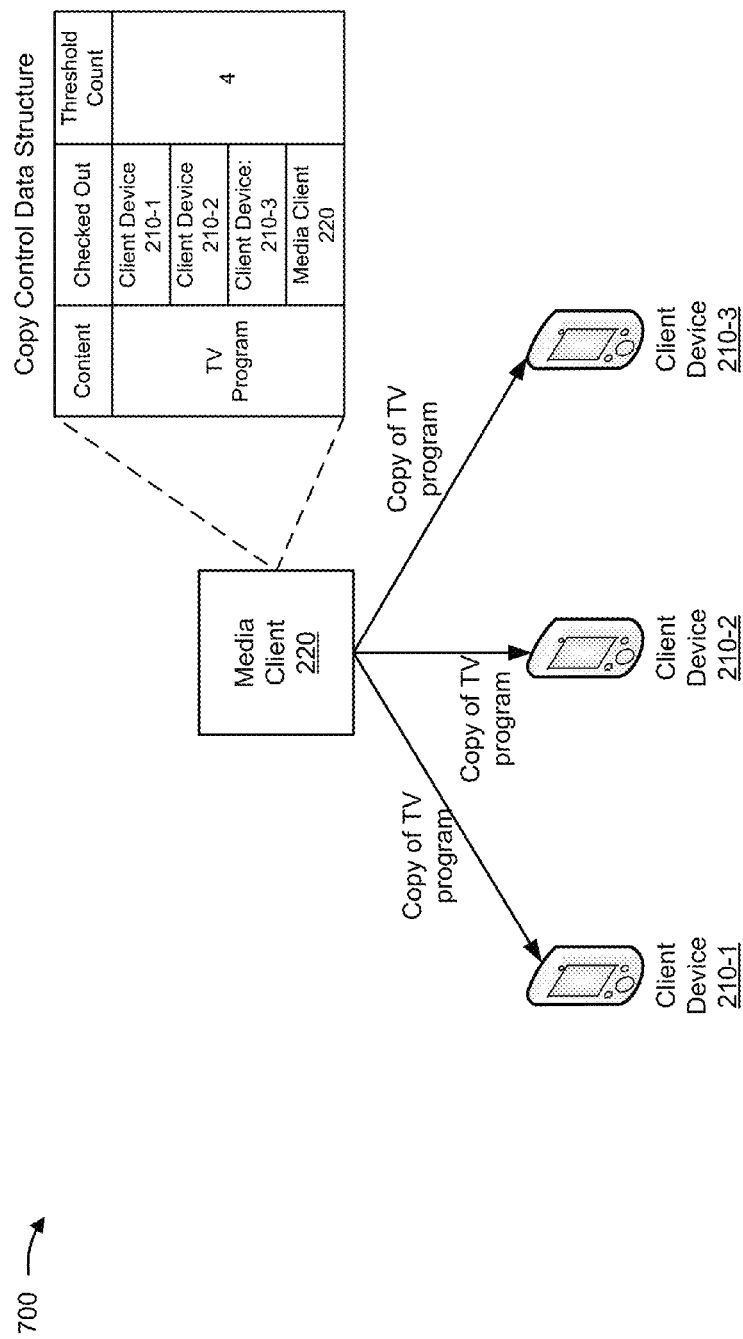
FIGS. 7A and 7B are diagrams of an example implementation relating to the example processes shown in FIGS. 4-5B.
Figure 7B:
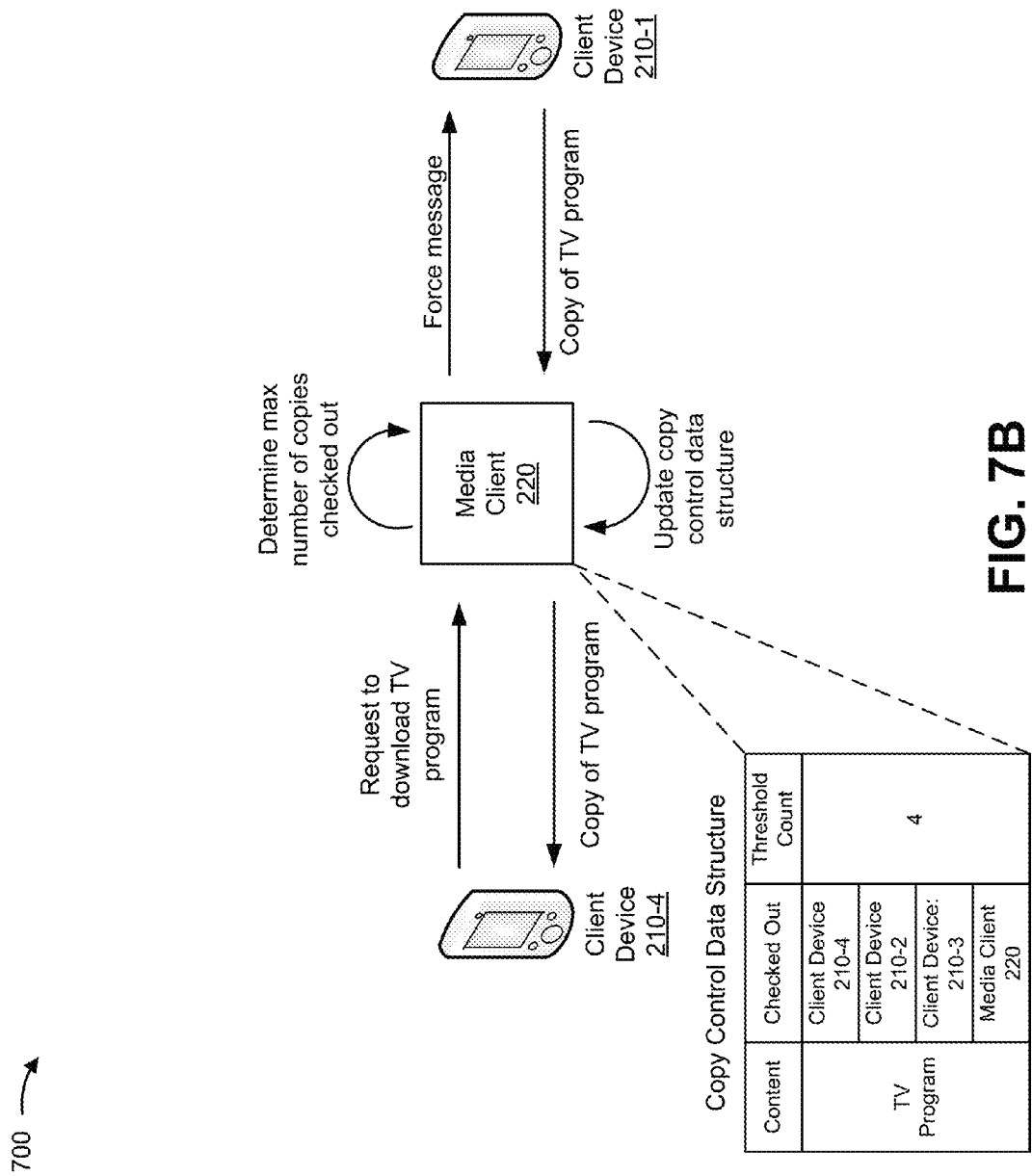

FIGS. 7A and 7B are diagrams of an example implementation 700 relating to the example processes shown in FIGS. 4-5B.

In FIG. 7A, assume media client 220 recorded a TV program and stores a copy of the TV program. Further, assume the TV program is associated with a threshold count of four copies, including a copy stored by media client 220. In other words, assume media client 220 is permitted to store a copy of the TV program and have three copies of the TV program checked out to client devices 210 at any given time.

As shown in FIG. 7A, media client 220 may check out and provide a copy of the TV program to client devices 210-1 to 210-3. Assume media client 220 stores a copy control data structure that indicates a copy of the TV program is checked out to client devices 210-1 to 210-3 and that a copy of the TV program was checked out to client device 210-1 before client devices 210-2 and 210-3.

A shown in FIG. 7B, assume that a client device 210-4 sends a request to download the TV program to media client 220. Media client 220 may receive the request and determine that the copy count for the TV program is four (e.g., four copies checked out to media client 220 and client devices 210-1 to 210-3). Accordingly, media client 220 may determine that the copy count equals the threshold count, and thus the copy count does not satisfy the threshold count. Based on the copy count failing to satisfy the threshold count, media client 220 may determine to force one of client devices 210-1 to 210-3 to check in a copy of the TV program. Assume media client 220 selects client device 210-1 to force to check in a copy of the TV program based on client device 210-1 being the earliest client device 210 to check out a copy of the TV program. Media client 220 may send a force message to client device 210-1.

Client device 210-1 may receive the force message and send, based on the force message, a response to media client 220 including the copy of the TV program stored by client device 210-1. Thus, the copy of the TV program may be removed from client device 210-1.

Media client 220 may receive the copy of the TV program from client device 210-1. Assume media client 220 checks that the copy of the TV program has been received from client device 210-1 and then deletes the copy of the TV program because media client 220 already stores a copy of the TV program. Media client 220 may check in the copy of the TV program and update the copy control data structure to indicate that a copy of the TV program is no longer checked out to client device 210-1. Media client 220 may decrement the copy count to three based on checking in the copy of the TV program. Media client 220 may determine that the copy count now satisfies the threshold count and send client device 210-4 a notification that a copy of the TV program is ready to be downloaded.

Client device 210-4 may receive the notification and initiate a download of a copy of the TV program from media client 220. Media client 220 may provide a copy of the TV program to 210-4 and update the copy control data structure to indicate a copy of the TV program is checked out to client device 210-4.

As indicated above, FIGS. 7A and 7B are provided merely as an example. Other examples are possible and may differ from what was described with regard to FIGS. 7A and 7B.

Figure 8A:
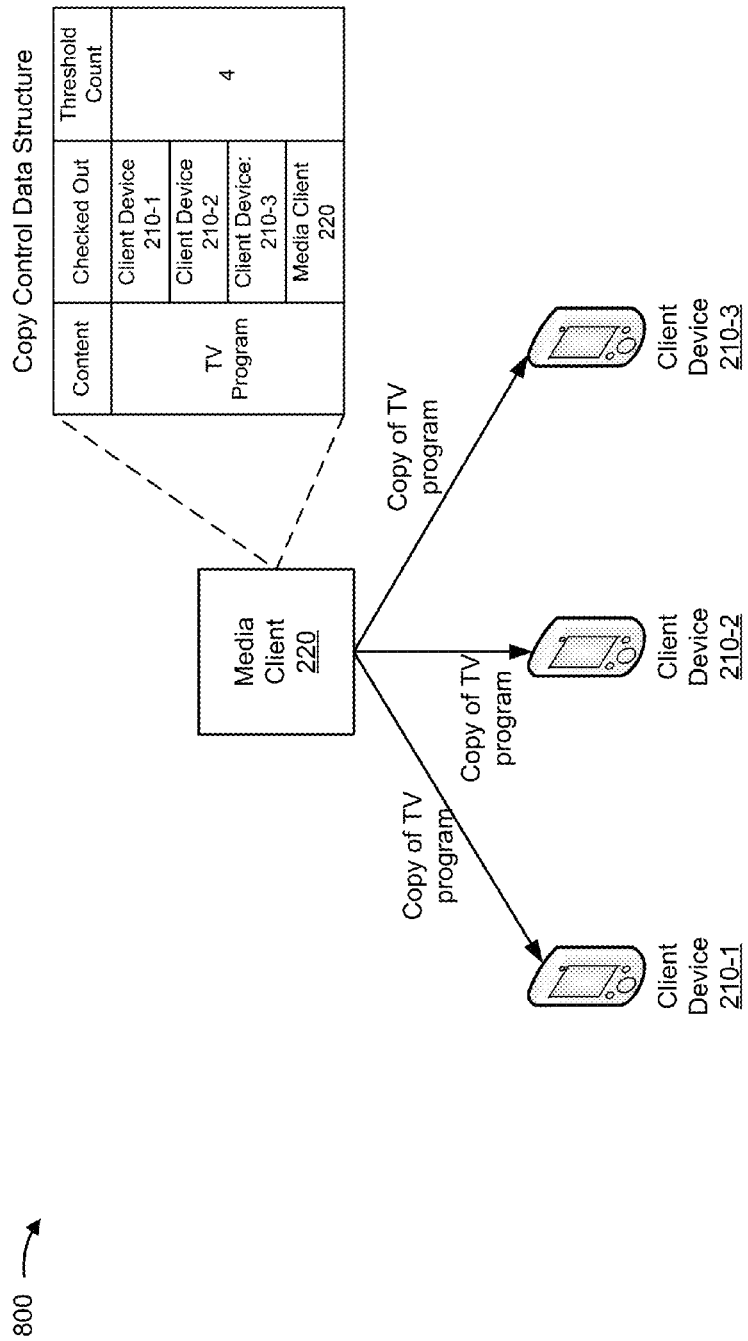
Figure 8B:
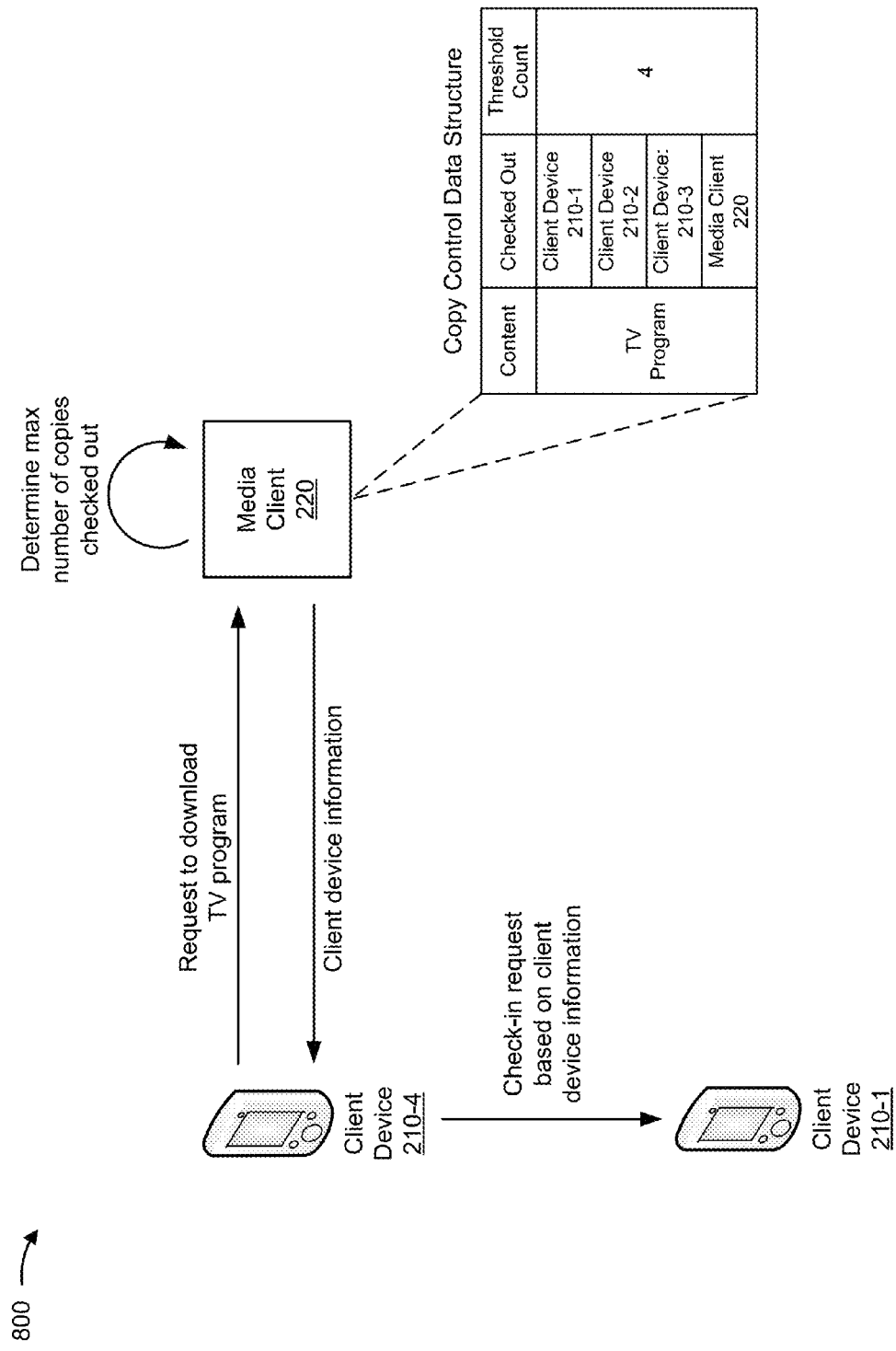

FIGS. 8A-8C are diagrams of an example implementation 800 relating to the example processes shown in FIGS. 4 and 6.

In FIG. 8A, assume media client 220 recorded a TV program and stores a copy of the TV program. Further, assume the TV program is associated with a threshold count of four copies, including a copy stored by media client 220. In other words, assume media client 220 is permitted to store a copy of the TV program and have three copies of the TV program checked out to client devices 210 at any given time.

As shown in FIG. 8A, media client 220 may check out and provide a copy of the TV program to client devices 210-1 to 210-3. Assume media client 220 stores a copy control data structure that indicates a copy of the TV program is checked out to client devices 210-1 to 210-3.

A shown in FIG. 8B, a client device 210-4 may send a request to download the TV program to media client 220. Media client 220 may receive the request and determine that the copy count for the TV program is four (e.g., four copies checked out to media client 220 and client devices 210-1 to 210-3). Accordingly, media client 220 may determine that the copy count equals the threshold count, and thus the copy count does not satisfy the threshold count. Based on the copy count failing to satisfy the threshold count, media client 220 may send client device information to client device 210-4. The client device information may indicate that client devices 210-1 to 210-3 currently have a copy of the TV program checked out and indicate contact information for client devices 210-1 to 210-3.

Client device 210-4 may receive the client device information and present the client device information to a user of client device 210-4. Client device 210-4 may prompt the user to select one or more of client devices 210-1 to 210-3 to which to send a check-in request. Assume the user selects client device 210-1 to which to send a check-in request via user input. Client device 210-4 may send the check-in request to client device 210-1 based on client device 210-1 being selected.

In FIG. 8C, assume client device 210-1 receives the check-in request. Assume client device 210-1 has already played back the TV program to a user of client device 210-1. Accordingly, client device 210-1 may automatically determine to check in the TV program. Client device 210-1 may delete the copy of the TV program stored by client device 210-1. Client device 210-1 may send a response to media client 220 checking in the copy of the TV program and indicating that the copy of the TV program has been deleted from client device 210-1.

Media client 220 may receive the response checking in the copy of the TV program from client device 210-1. Media client 220 may check in the copy of the TV program and update the copy control data structure to indicate that a copy of the TV program is no longer checked out to client device 210-1. Media client 220 may decrement the copy count to three based on checking in the copy of the TV program. Media client 220 may determine that the copy count now satisfies the threshold count and send client device 210-4 a copy of the TV program. Media client 220 may update the copy control data structure to indicate a copy of the TV program is now checked out to client device 210-4.

As indicated above, FIGS. 8A-8C are provided merely as an example. Other examples are possible and may differ from what was described with regard to FIGS. 8A-8C.

Implementations described herein may allow a media client to provide a copy of content to a client device even though a maximum number of copies of the content are checked out by causing another client device to check in a copy of the content first. For example, the media client may request that another client device check in the content and/or force the other client device to check in a copy of the content so that a copy of the content may be provided to a client device requesting a copy of the content.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   storing, by a media client device, content;
   storing, by the media client device, a copy count that indicates a quantity of copies of a first content, of the content, that are checked out from the media client device;
   receiving, by the media client device, a request to provide a first copy of the first content to a requesting device;
   determining, by the media client device, that the copy count is greater than or equal to a threshold count,
      the threshold count indicating a permitted quantity of copies of the first content that may be checked out from the media client device, and
      the threshold count being greater than one;
   sending, by the media client device, client device information to the requesting device based on the copy count being greater than or equal to the threshold count,
      a client device being selected to be sent a check-in message based on the client device information,
         the client device information including:
            when the client device checked out a second copy of the first content,
            a priority of the client device, and
            an amount of the content that the client device has checked out, and
         the requesting device sending the check-in message to the client device based on the client device being selected;
   receiving, by the media client device, a check-in response from the client device that checks in the second copy of the first content;
   updating, by the media client device, the copy count based on the second copy of the first content being checked in; and
   providing, by the media client device, the first copy of the first content to the requesting device based on the updated copy count satisfying the threshold count.

2. The method of claim 1, further comprising:
   sending a notification to the requesting device indicating that the first copy of the first content is ready to be provided; and
   receiving a ready response indicating that the requesting device is ready to be provided the first copy of the first content,
      where providing the first copy of the first content includes providing the first copy of the first content to the requesting device based on the ready response.

3. The method of claim 1, where the check-in message automatically causes the client device to check in the second copy of the first content based on the client device having played back the second copy of the first content.

4. The method of claim 1, further comprising:
   selecting the client device, from among a plurality of client devices that store checked-out copies of the first content, to which to send the check-in message based on an order of priority of the requesting device and the plurality of client devices,
      the plurality of client devices including the client device,
      the client device having a lower priority than the requesting device, and
      the checked-out copies of the first content including the second copy of the first content.

5. The method of claim 1, further comprising:
   selecting the client device, from among a plurality of client devices that store checked-out copies of the first content, to which to send the check-in message based on the client device being an earliest of the plurality of client devices having checked out a copy of the first content,
      the checked-out copies of the first content including the second copy of the first content.

6. The method of claim 1, further comprising:
   selecting the client device, from among a plurality of client devices that store checked-out copies of the first content, to which to send the check-in message based on the client device having a largest amount of the content checked out,
      the checked-out copies of the first content including the second copy of the first content.

7. A device, comprising:
   one or more processors to:
      store content,
         where the content includes multimedia content;
      store a copy count that indicates a quantity of copies of a first content, of the content, that are checked out from the device;
      receive a request to provide a first copy, of the first content, to a requesting device;
      determine, based on the request, that the copy count is greater than or equal to a threshold count;
      send client device information to the requesting device based on the copy count being greater than or equal to the threshold count,
         a client device being selected to be sent a check-in message based on the client device information, the client device information including:
            when the client device checked out a second copy of the first content,
            a priority of the client device, and an amount of the content that the client device has checked out, and the requesting device sending the check-in message to the client device based on the client device being selected;

receive, based on the check-in message, a check-in response from the client device that checks in the second copy of the first content;

update the copy count based on the second copy of the first content being checked in; and provide the first copy of the first content to the requesting device based on the updated copy count satisfying the threshold count.

8. The device of claim 7, where the one or more processors are further to:

store the client device information,
the client device information indicating a plurality of client devices that store checked-out copies of the first content,
the client devices including the client device, and
he checked-out copies of the first content including the second copy of the first contents.

9. The device of claim 7, where the one or more processors are further to:

select the client device to which to send the check-in message based on a combination of factors,
the factors including the client device having a lower priority than the requesting device.

10. The device of claim 7, where the one or more processors are further to:

select the client device to which to send the check-in message based on a combination of factors,
the factors including whether the client device has played back the second copy of the first content.

11. The device of claim 7, where the one or more processors are further to:

provide a list of client devices that store checked-out copies of the first content to the requesting device,
the list of client devices indicating the client device,
receive a selection from the requesting device based on providing the list of client devices; and
select the client device based on the selection.

12. The device of claim 7, where the one or more processors are further to:

select a plurality of client devices to send the check-in message,
the plurality of client devices including the client device;
determine that none of the plurality of client devices have checked in their copy of the first content based on the check-in message; and
select the client device to force check-in of the second copy of the first content based on determining that none of the plurality of client devices have checked in their copy of the first content based on the check-in message.

13. The device of claim 12, where the one or more processors, when selecting the client device to force check-in of the second copy of the first content, are to:

select the client device to force to check in the second copy of the first content based on a check-out factor,
the check-out factor including at least one of:
when client device checked out the second copy of the first content,
the priority of the client device,
the amount of the content that the client device has checked out,
whether the client device has presented or played back the second copy of the first content, a random selection of the client device, or
user selection of the client device.

14. A computer-readable medium storing instructions, the instructions comprising:

one or more instructions that, when executed by one or more processors of a media client device, cause the one or more processors to:
store content;
store a copy count that indicates a quantity of copies of a first content, of the content, that are checked out from the media client device;
receive a request to provide a first copy of the first content to a requesting device;
determine, based on the request, the copy count is greater than or equal to a threshold count,
the threshold count indicating a permitted quantity of copies of the first content that may be checked out from the media client device;
send client device information to the requesting device based on the copy count being greater than or equal to the threshold count, a client device being selected to receive a check-in message based on the client device information the client device information including:
when the client device checked out a second copy of the first content,
a priority of the client device, and
an amount of the content that the client device has checked out, and
the requesting device sending the check-in message to the client device based on the client device being selected;
receive, based on the check-in message, a check-in response from the client device that checks in the second copy of the first content;
update the copy count based on the second copy of the first content being checked in; and
provide the first copy of the first content to the requesting device based on the updated copy count satisfying the threshold count.

15. The computer-readable medium of claim 14, where the check-in message includes a request that gives the client device an option to check in the second copy of the first content.

16. The computer-readable medium of claim 14, where the check-in message includes a command that forces the client device to check in the second copy of the first content.

17. The computer-readable medium of claim 14, where the one or more instructions, when executed by the one or more processors, further cause the one or more processors to:

store the client device information,
the client device information indicating client devices that store checked-out copies of the first content,
the client devices including the client device, and
the checked-out copies of the first content including the second copy of the first content; and
where the one or more instructions, when executed the one or more processors, further cause the one or more processors to:
send the check-in message to each of the client devices, that store checked-out copies of the first content, based on the client device information.

18. The computer-readable medium of claim 17, where the check-in message includes a request to check-in one or more of the checked-out copies of the first content, and where the one or more instructions, when executed by the one or more processors, further cause the one or more processors to:
send a force message to the client device based on the client devices failing to check in any of the checked-out copies of the first content,
the force message including a command that forces the client device to check in the second copy of the first content; and
where the one or more instructions, that cause the one or more processors to receive the check-in response, cause the one or more processors to:
receive the check-in response from the client device based on the force message.

19. The computer-readable medium of claim 14, where the client device information indicates client devices that store checked-out copies of the first content,
the client devices including the client device, and
where the client device information causes the requesting device to send the check-in message to the client device.

20. The computer-readable medium of claim 14, where the one or more instructions, when executed by the one or more processors, further cause the one or more processors to:
receive playback information from the client device that indicates the client device has played back the second copy of the first content, and
cause the check-in message to be sent to the client device based on the client device having played back the second copy of the first content.

\* \* \* \* \*